UNITED STATES PATENT OFFICE.

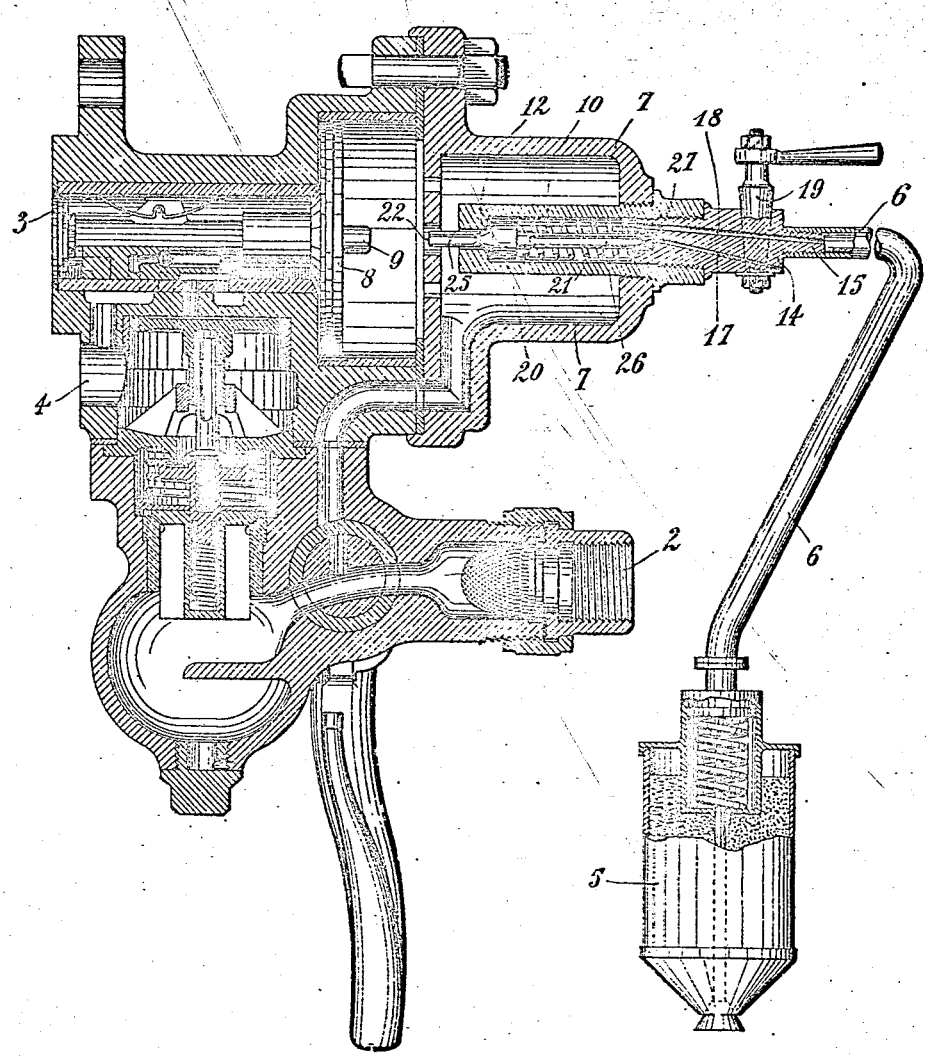

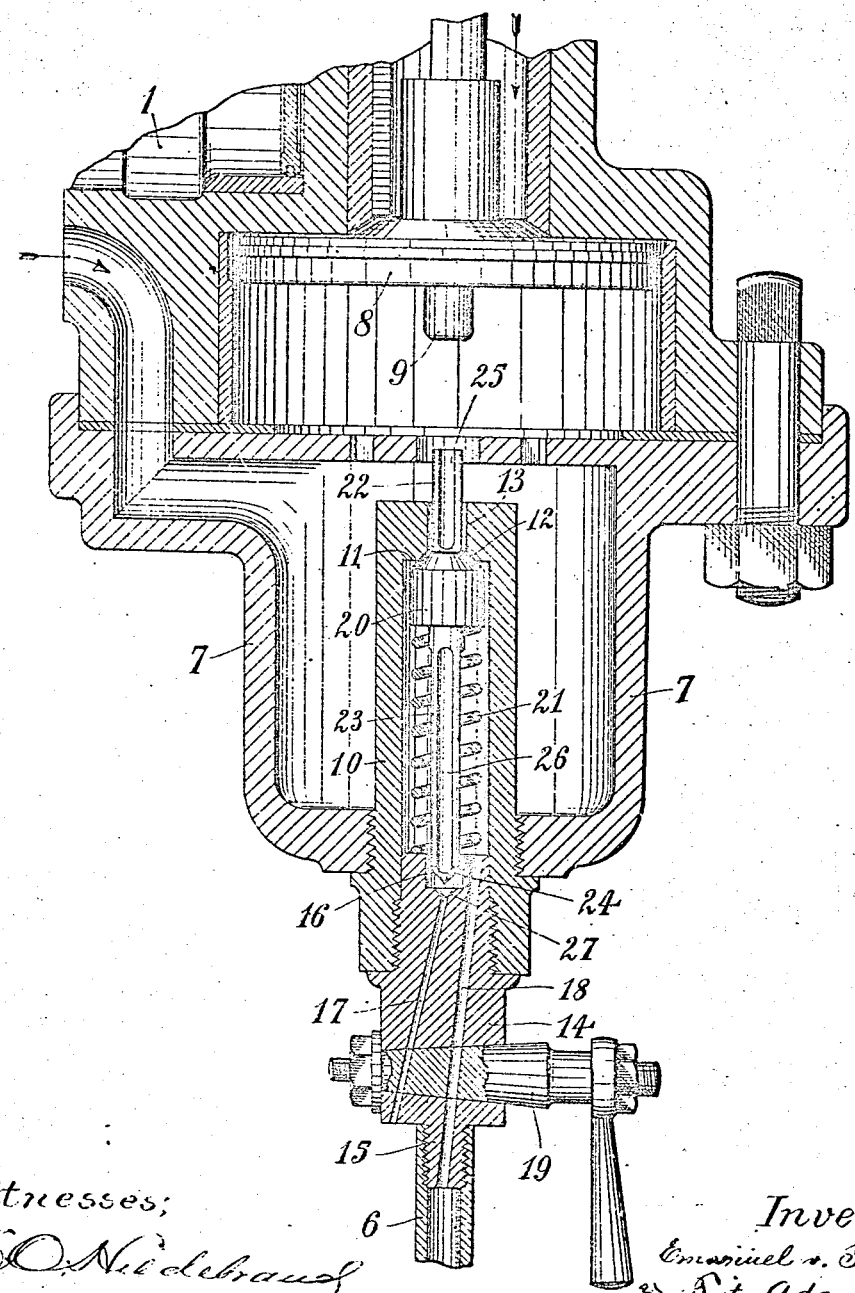

EMANUEL V. PLANTA AND FRITZ ADAM, OF BERNE, SWITZERLAND.

BRAKE MECHANISM.

No. 899,069.  Specification of Letters Patent.  Patented Sept. 22, 1908.

Application filed November 14, 1905, Serial No. 287,230. Renewed May 7, 1908. Serial No. 431,333.

*To all whom it may concern:*

Be it known that we, EMANUEL VON PLANTA and FRITZ ADAM, citizens of Switzerland, residing at Berne, Switzerland, have invented certain new and useful Improvements in Brake Mechanism; and we do hereby declare the following to be a full, clear, and exact description of the invention, such as will enable others skilled in the art to which it appertains to make and use the same.

Our invention relates to improvements in brake mechanisms for vehicles and particularly for vehicles that are coupled together to form a train and are provided with air brake mechanism operated from a central place as for instance from the locomotive cab. And the object of our improvement is to increase the efficiency of the air brake by arranging a sanding device on several of the vehicles composing a train, and by providing an operative connection between said sanding devices and the brake mechanism, whereby the sanding devices will be automatically thrown into operation when the brake mechanism is operated, and particularly when it is operated for emergency work.

Our invention also relates to certain simple and effective means whereby the sanding devices arranged on the different vehicles are thrown in operation by one of the movable members of the brake mechanism disposed on the particular vehicle.

With these objects in view, our invention also consists in certain novel features of construction as will be set forth hereinafter and pointed out in the claims, reference being had to the accompanying drawings, in which:

Figure 1 is a diagrammatical view, illustrating the connection between the sanding device and the brake mechanism, and Fig. 2 is a cross section of a part of the triple valve, of the Westinghouse air brake mechanism, illustrating in detail our improved operator for the sanding device.

Similar letters of reference refer to similar parts throughout the views.

For the purpose of explaining our invention, we have shown in the accompanying drawings, a part of the Westinghouse air brake mechanism and in combination therewith our improved operator for the sanding device, which, in the present example is connected with the triple valve of the brake mechanism. Said valve is designated by the reference numeral 1. It is connected with the train pipe by a passage 2, with the reservoir by a passage 3 and with the brake cylinder by a passage 4, as is well known in the art. A sanding device 5 of any preferred construction is connected with the drain cup 7 by a tube 6.

The piston 8 of the triple valve is provided with a stud 9 centrally extending therefrom and located on the side of the drain cup 7. Opposite the piston and in line therewith, a sleeve 10 is screwed into the drain cup. At the side of the piston, it is provided with an inner annular shoulder 11 forming a valve seat 12 and a central bore 13. At its opposite side, it is closed by a screw-plug 14, having a screw-threaded stud 15 extending outward therefrom and adapted to receive the tube 6 referred to above. On its inside, said plug is formed with a central bore 16 from which a canal 17 extends through said plug to the atmosphere. Another canal 18 arranged sidewise of the bore 16 extends through said plug to form a connection between the tube 6 and the inside of the sleeve 10. By means of a cock 19, the canals 17 and 18 can be closed at will. Centrally located in the sleeve is a valve 20 seated on the valve seat 12 and normally closing the boring 13 under the pressure of a coiled spring 21. Said valve is provided with a stem 22 extending through said boring into the path of the stud 9 of the piston 8. This stem 22 serves as the graduating stop or yielding abutment for the main piston of the triple valve. At its rear, the valve, 20, is provided with a stem 23 extending into the central bore 16 of the plug 14 and in front of the outer passage of the canal 17. At its end, the stem 23 is shaped as a valve 24, and correspondingly the outlet passage of the canal 17 is formed as a valve seat 27. Normally the valve 24 leaves the canal 17 uncovered to permit free passage of the air from the inside of the sleeve 10 to the atmosphere. The stems 22 and 23 are provided with longitudinal grooves 25 and 26 to permit the free passage of air from the drain cup to the inside of the sleeve, or from the inside of the sleeve to the atmosphere when the valve 20 or 24 is opened. It will be apparent to those skilled in the art that the valve 20, the stems 22 and 23 and the spring 21 form the emergency stop for the piston 8, which will be moved only in case of "emergency" work of the brake mechanism.

In explaining the operation of our improved sanding device, we will assume that the vehicle is provided with a brake mechanism of the Westinghouse type. We wish it to be understood, however, that the invention can also be applied to brake mechanism of other types, by providing an operative connection between the movable parts of the brake mechanism and a suitable sanding device.

In order to bring the vehicle to a stop or to reduce its speed, the engineer will move the handle of the engineer's valve, in case of ordinary or service application of the brakes, to such a position that the pressure of the fluid contained in the train line pipe will be slightly reduced. Thereby he will cause the piston 8 to move toward the stem 22 of the valve 20. The reduction of the pressure is, however, not sufficient to overcome the counter-pressure of the spring 21. The brakes will therefore be applied in the well known manner, but the sanding device will not be put in operation. If, however, the engineer moves the brake valve handle to the "emergency" position, the pressure in the train line pipe will be decreased to such an extent that the piston 8 moves with considerable energy towards the valve 20, and the stud 9 will rest against the stem 22 with sufficient pressure so as to overcome the tension of the spring 21 and to raise the valve 20 from its seat. The result will be at first that the emergency operation of the brake is effected, as is well known to those familiar with the art, and second, that compressed air passes through the sleeve 10, the canal 18 and the tubular connection 6 to the sanding device 5, whereby the latter is caused to discharge sand to the track. During this operation, the canal 17 is closed, the stem 23 resting with its valve portion 24, on the valve seat 27, so that no air can escape through the canal 17 to the atmosphere. If, for the purpose of releasing the brakes, the pressure in the train line pipe is again raised to its normal value, the valve 20 will be seated again on its seat and prevent the passage of air from the train line pipe and drain cup to the sanding apparatus, and the compressed air contained in the sleeve 10 and tubular connection 6 as well as any leakage that may occur through the valve 20 will readily escape to the atmosphere through the canal 17.

Should it be desirable to put the sanding apparatus temporarily out of operation, the cock 19 will be turned at a right angle whereby the canals 17 and 18 are closed.

We have found that sanding devices heretofore in use in trains and which were arranged on one of the vehicles only, viz., the locomotive, did not operate satisfactorily, because in applying the brakes and the sanding device of the locomotive, the latter found more resistance on the track than the vehicles, which resulted in considerable shocks between the vehicles and even endangered the security of the whole train. Besides the wheels of the locomotive were exposed to undue wear by being ground by the sand. To avoid these disadvantages, we arrange a sanding device of the character described on several of the vehicles and connect the same to the brake mechanism in the manner described. The resistance offered to the different vehicles of the train is therefore distributed all over the train, and the time within which the train can be stopped, is considerably decreased.

Having thus described our invention, what we claim as new and desire to secure by Letters Patent, is:

1. The combination, with the main piston of the triple valve, of a sanding device, and means operated directly by the main piston for actuating the sanding device.

2. The combination, with the main piston of a triple valve, of a yielding abutment for said main piston, and means controlled by said yielding abutment for applying sand to the tracks.

3. The combination, with the main piston of a triple valve, and a sanding device for applying sand to the tracks, of means for supplying fluid pressure to operate said sanding device, and a graduating stop for said main piston, said stop being provided with a valve arranged to control the supply of fluid pressure which operates the sanding device.

4. The combination, with a triple valve having a main piston, of a sleeve secured to the triple valve case, a valve located in said sleeve arranged to close the inner end of the same, and provided with a stem arranged to serve as a graduating stop for the main piston, a sanding device arranged to be operated by air pressure, an air-pipe between said sanding device and the interior of said sleeve, and yielding means for holding said valve normally closed.

5. The combination, with a triple valve having a main piston, of a sleeve secured to the triple valve and having a valve seat at its inner end, a plug secured in the outer end of the sleeve and having an exhaust valve seat and an exhaust port leading to the outer air, a valve arranged to coöperate with the valve seat at the inner end of the sleeve, a stem for said valve whose inner end serves as a graduating stop for the main piston and whose outer end is arranged as a valve to close the exhaust port in the plug, means for normally pressing the valve stem toward the main piston, a sanding device, and means for conducting air from the interior of the sleeve to the said sanding device to operate the same.

6. In vehicles, the combination with a track sanding device having its sand discharge controlled by a pressure fluid, and the triple valve of an air brake mechanism and its piston, of a tubular connection between the drain cup of said valve and said sand discharge apparatus, and a valve rigidly connected with the spring actuated emergency stop of the piston, and actuated thereby to open or close said tubular connection.

In testimony whereof we affix our signatures to this specification, in the presence of two witnesses.

EMANUEL V. PLANTA.
FRITZ ADAM.

Witnesses:
FRIEDRICH NAEGELI,
NATHANAËL LEUBA.